United States Patent [19]

Osaka et al.

[11] Patent Number: 5,108,830
[45] Date of Patent: Apr. 28, 1992

[54] SHAPE-STABLE REENTRY BODY NOSE TIP

[75] Inventors: Walter K. Osaka, Santa Clara; Thomas T. Ngai, San Francisco; Anthony Wereta, Jr., San Jose, all of Calif.

[73] Assignee: The United States Government as represented by the Secretary of the Navy, Washington, D.C.

[21] Appl. No.: 660,214

[22] Filed: Feb. 1, 1991

[51] Int. Cl.$^5$ ............................................. B32B 7/00
[52] U.S. Cl. ................................... 428/257; 428/105; 244/158 A; 244/160; 244/121; 244/133; 423/447.1; 423/447.2
[58] Field of Search ............... 428/257, 258, 259, 105; 244/158 A, 160, 121, 133; 423/447.1, 447.2

[56] References Cited

U.S. PATENT DOCUMENTS

| | | | |
|---|---|---|---|
| 3,995,602 | 5/1976 | King | 139/11 |
| 4,001,478 | 1/1977 | King | 428/257 |
| 4,131,708 | 12/1978 | Moores, Jr. et al. | 428/257 |
| 4,219,597 | 8/1980 | Maistre | 428/105 |
| 4,252,588 | 2/1981 | Kratsch et al. | 156/73.6 |
| 4,515,847 | 5/1985 | Taverna et al. | 428/107 |
| 4,623,106 | 11/1986 | Price, Jr. et al. | 244/3.1 |
| 4,686,134 | 8/1987 | Ono | 428/222 |
| 4,824,710 | 4/1989 | Dieul | 428/113 |

FOREIGN PATENT DOCUMENTS

2022160 12/1979 United Kingdom .

Primary Examiner—Brooks H. Hunt
Assistant Examiner—Ngoclan T. Mai
Attorney, Agent, or Firm—Wayne O. Hadland; Kenneth L. Warsh; Robert M. Wohlfarth

[57] ABSTRACT

A reentry body nose tip constructed from materials and produced by a process such that shape stability is maintained under ablative erosion occurring during atmospheric reentry.

1 Claim, 6 Drawing Sheets

SHAPE-STABLE REENTRY BODY NOSE TIP

FIELD OF THE INVENTION

The present invention relates to ablative atmospheric reentry bodies, and more particularly to a shape-stable fiber-reinforced carbon matrix nose tip having a metallized central core suitable for use on a ballistic missile reentry body.

BACKGROUND OF THE INVENTION

The ability of a high-bluntness-ratio reentry body to accurately strike a target is very dependent upon nose tip performance. A major influence on nose tip performance is the ablative erosion occurring during atmospheric reentry. Thus there has been a continual striving to improve nose tip designs to obtain more consistent performance under a variety of atmospheric conditions.

OBJECTS, FEATURES, AND ADVANTAGES

It is an object of this invention to provide a shape-stable nose tip that will minimize reentry body impact dispersion during reentry.

It is another object of this invention to provide a shape-stable nose tip having low vulnerability to defensive counter-measures.

It is yet another object of this invention to provide a shape-stable nose tip that maintains structural integrity during reentry.

It is a feature of this invention to use tungsten carbide reinforcement (tungsten wire which is converted to tungsten carbide during the manufacturing processing steps) as axial reinforcement in a cylindrical central core zone.

It is another feature of this invention that the diameter of the cylindrical central core zone is minimized, to lessen vulnerability to defensive countermeasures and to minimize adversely affecting structural strength.

It is an advantage of this invention to maintain a symmetrical blunt contour following transition, with repeatable drag forces and negligible lateral forces.

SUMMARY OF THE INVENTION

Accordingly the present invention relates to a high-bluntness-ratio reentry body shape-stable fiber-reinforced carbon matrix nose tip having a metallized core, suitable for use on a ballistic missile reentry body.

There are several important attributes of a successful shape-stable nose tip. A metal carbide core which ablates faster than the surrounding nose tip material to maintain a necessary blunt profile is important. Several metals which would convert to a carbide during nose-tip processing appear to have favorable ablation characteristics.

The general manufacturing steps for producing the shape-stable nose tip include three-dimensional weaving of reinforcement bundles into a fabric preform, impregnation of the preform with pitch resin during a number of processing steps undertaken to form a rigid billet, and machining of the billet to the desired size and shape of the nose tip.

DESCRIPTION OF THE PREFERRED EMBODIMENT

Before proceeding with a detailed description of the manufacturing process, particular documents will be listed and incorporated by reference, and terminology and compositions of the important components will be provided.

DOCUMENTS INCORPORATED BY REFERENCE

The following four Department of the Navy, Naval Sea Systems Command, Weapon System Specifications (hereinafter NAVSEA WS) are hereby incorporated by reference:

NAVSEA WS 23198, entitled "Fiber, Carbon, Continuous Filament Yarn, Pitch Precursor General Specification For", which establishes the requirements for a continuous filament carbon fiber yarn made from a pitch precursor.

NAVSEA WS 23199, entitled "Preform, Three Dimensional, Carbon Fiber Yarn, Pitch Precursor General Specification For", which establishes the requirements for a preform woven orthogonally in three dimensions using a carbon fiber yarn made from a pitch precursor.

NAVSEA WS 23200, entitled "Pitch, Petroleum Based, General Specification For", which establishes the requirements for petroleum based pitch used for impregnation of a woven preform.

NAVSEA WS 23201, entitled "Material and Process Requirements for the Shape Stable Nose Tip Billet", which defines the process requirements for pitch impregnating and densifying the preform.

The following Military Specification is hereby incorporated by reference:

MIL-Y-87125A(USAF), entitled "Military Specification, Yarn, Graphite, 1000/3000 Filaments".

The following American Society for Testing and Materials (ASTM) specification is hereby incorporated by reference:

ASTM F 288-81, entitled "Standard Specification for Tungsten Wire for Electron Devices and Lamps".

DEFINITION AND COMPOSITION OF COMPONENTS

Preform

A three-dimensional woven structure, in the form of a cube that has been elongated in one direction (Z), made by weaving bundles in three orthogonal directions (i.e., X, Y, and Z). For the preform constructed in making the nose tip (to which the word "preform" applies within this document) the Z direction is the nose tip axis of radial symmetry (i.e., the flight axis). The term "weaving" is used herein in a broad sense to indicate moving into close adjacency with and overlapping of adjacent bundles rather than requiring an interlacing of these bundles. This weaving is performed in a way such that the bundles are in close touching contact with each other; in this way the woven preform structure acquires self-supporting three-dimensional integrity because of the friction between adjacent bundles. One method for producing a preform is taught by U.S. Pat. No. 3,955,602 (illustrated in FIG. 1 thereof), issued to Robert W. King, entitled "Apparatus for Fabricating Three-Dimensional Fabric Material", which is hereby incorporated by reference. The nose-tip preform 30, shown in FIG. 4, has a square cross-section (X-Y plane) of from 140 to 159 mm width (nominally 150 mm) on each of four sides (corresponding to nominally 170 X-direction bundles and 170 Y-direction bundles spaced on centerlines 0.89 mm apart, measured in the X-Y plane). The height (Z dimension) is from 235 to 267 mm corresponding to 418 layers (i.e., square planes) of pitch yarn spaced 0.60 mm apart (measured in the Z direction) for a nominal 250 mm height. The minimum bulk density is 0.80 grams/cc. Additional specifications pertaining to the nose-tip preform are contained in NAVSEA WS 23199.

Billet

A rigid block, in the form of a cube that has been elongated in one direction (Z), produced by the process of impregnating the nose-tip preform 30 with pitch and subjecting it to heat and pressure processing steps, and subsequently machining to size. The nose-tip billet 40 shown in FIG. 6 has nominal X and Y (square cross section) dimensions of 133 mm, and a height (Z) of 229 mm. Additional detailed specifications pertaining to the nose-tip billet are contained in NAVSEA WS 23201.

Pitch

A tar-like material used for impregnating the nose-tip preform 30 in the process of transforming the preform 30 into a billet 40. The pitch used is a petroleum-based product, having a softening point between 110 and 125 degrees Celsius, a density between 1.20 and 1.30 grams/cc, and a dynamic viscosity of between 9 and 25 centipoises at 270 degrees Celsius. The compositional requirements by weight percentages are: ash content, 0.15 maximum; toluene-insolubles, 10.0 maximum; quinoline-insolubles, 1.0 maximum; sulfur content, 3.0 maximum. The minimum coke value is 45.0 percent. Such pitch is commercially available from Ashland Petroleum Company as A-240 petroleum-based pitch; additional detailed pitch specifications are given in NAVSEA WS 23200.

Intermediate Product

The convenient term used to designate the preform 30 during the pitch-impregnating process as it is being transformed into a rigid-block billet 40.

Site

Figure 3:
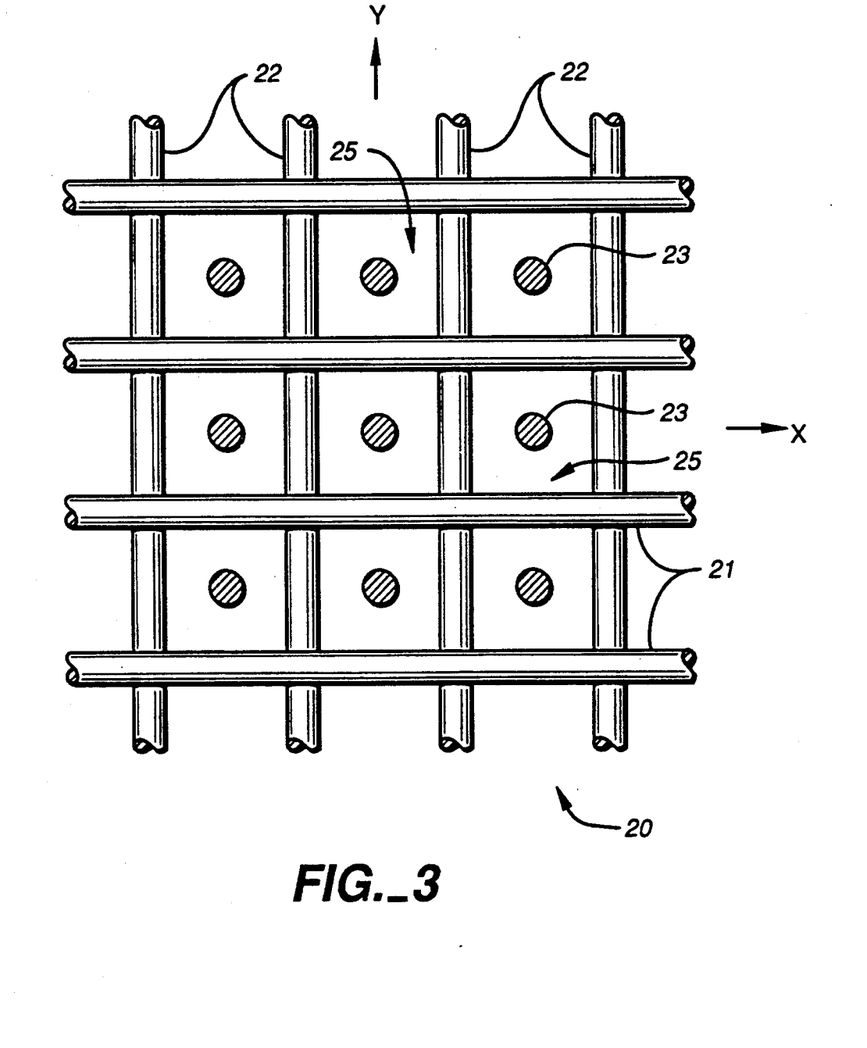
FIG. 3 is a view (in the X-Y plane) taken along the line 3—3 in FIG. 2, showing X bundles situated above Y bundles, with a circle representing a Z bundle running axially through each site.

The individual zones 25 (in an X-Y plane across a preform) bounded by the centerlines of two adjacent X-direction bundles 21 and two adjacent Y-direction bundles 22 (akin to the squares of a checkerboard), through each of which one Z-direction bundle 23 passes, as shown in FIG. 3. For the nose-tip preform 30 the average spacing between centerlines of X bundles 21 (measured in the Y direction), and also for Y bundles 22 (measured in the X direction), is specified (in NAVSEA WS 23199) as from 0.84 to 0.94 mm.

Pitch Yarn

A twisted bundle of 1900 to 2000 filaments, a minimum of 99% carbon by weight, obtained from a petroleum-based meso-phase pitch precursor, having from 24 to 33 twists per meter. The density is from 1.95 to 2.10 gram/cc, and weight per length is from 0.30 to 0.34 grams/meter (resulting in a nominal filament diameter of 10 microns for a 1950 filament yarn). Commercially obtainable from AMOCO Performance Products as carbon fiber P-55 2K 320 HT; additional detailed pitch yarn specifications are given in NAVSEA WS 23198. Pitch yarns are the reinforcing bundles used for the nose tip preform in the X and Y directions, and also in the Z direction except for within the cylindrical central core zone 16.

Metallized Strand

A bundle consisting of sixteen untwisted nominally 76 micron diameter tungsten wires and one yarn of nominally one thousand polyacrylonitrile (hereinafter PAN) filaments. The tungsten wire shall have properties per ASTM F 288-81, Type 1A. The PAN yarn shall have properties per MIL-Y-87125A Type I, except that the yarn length per unit weight shall be a minimum of 12.4 meters per gram (resulting in a nominal filament diameter of 7.5 microns for a one thousand filament yarn). Metallized strands are used (instead of pitch yarns) as Z-direction reinforcing bundles for the nose tip preform 30 within the cylindrical central core zone 16; to this limited extent the nose-tip preform 30 deviates from the exact specifications of NAVSEA WS 23199.

Figure 1:
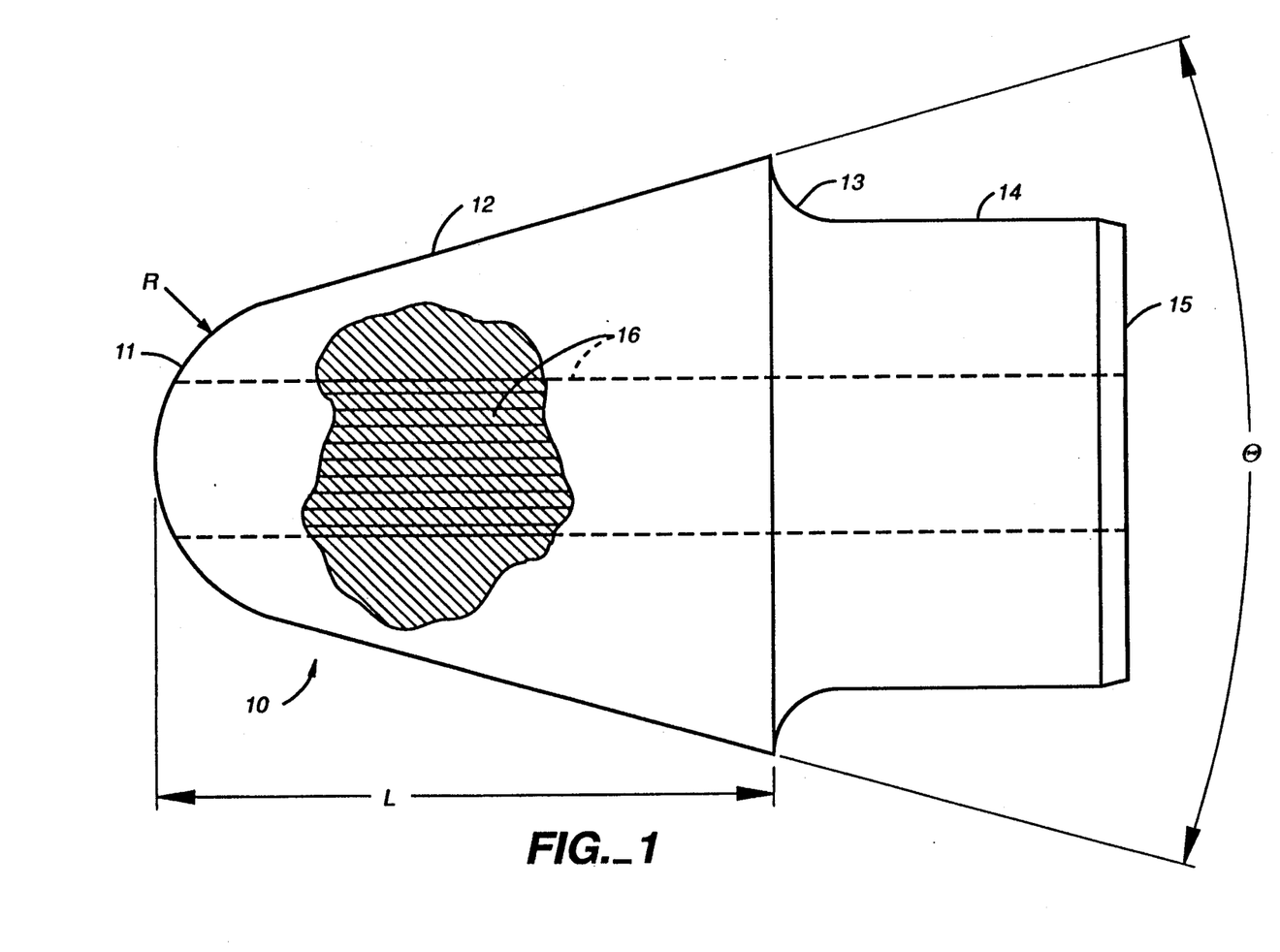
FIG. 1 is a side view of the generally conically-shaped nose tip of the present invention, with a portion broken away to indicate the fibrous reinforcement in general and in particular the metallic axial reinforcement in the cylindrical central core zone as indicated by heavier axial lines within the broken-out area (the core zone being indicated by dashed lines elsewhere).

Referring now to the drawings wherein like reference numerals are used to designate like or corresponding parts throughout the various figures thereof, there is shown in FIG. 1 the shape-stable nose tip 10 of the present invention. The nose tip 10 is machined from a billet 40 (a rigid block of fiber-reinforced carbon matrix material having a metallized core zone 16, shown in FIG. 6) which is produced by a process which will be later described in detail. FIG. 1 is a side view of the generally conically-shaped nose tip 10, with a portion broken away to indicate the fibrous nature of the reinforcement. A cylindrical central core zone 16 centered on the nose tip axis of symmetry (i.e., the axis of revolution, also designated as the flight axis) extends throughout the entire length of the nose tip 10, from the spherical front end 11 to the truncated rear end 15 of shank 14. The conical portion 12 of the nose tip 10 is tangent to the spherical portion of the front end 11 and extends rearward a distance "L" from the front end 11. The cylindrical shank 14 extends aft from the conical portion of the nose tip (a generous transition fillet 13 is illustrated) to provide a means for attachment to the main portion of the reentry body (which is not shown). The outside surface of the main portion of the reentry body (not shown) fits tangent to the aft end of nose tip conical portion 12; the exact dimensions of the shank 14 and fillet radius 13 are not important from the standpoint of the inventive subject matter.

Figure 2:
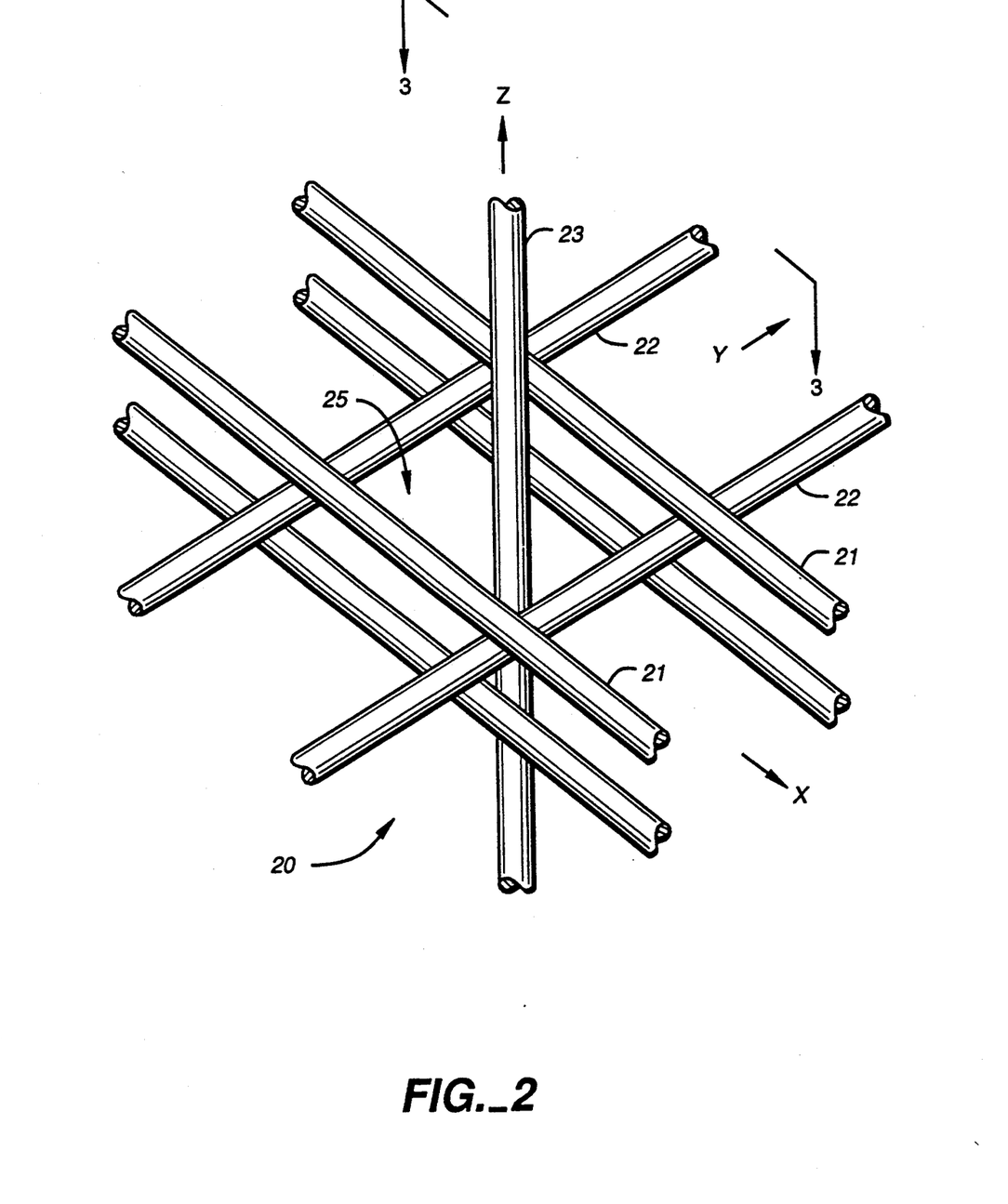
FIG. 2 illustrates the spatial relationship of adjacent reinforcement bundles within the nose tip structure, the Z direction running parallel to the axis of revolution of the generally conical nose tip shape.

FIG. 2 shows the orientation, in three-dimensional space, of a group of fiber bundles 20 from which the fabric preform 30 (illustrated in FIG. 4) is woven. The Z direction is parallel to the nose tip 10 axis of symmetry (i.e., the flight axis), the X and Y axes are orthogonal to each other and lie in the transverse plane (orthogonal to the Z axis). The centerline-to-centerline spacing of parallel bundles that lie in a transverse plane (i.e., X-direction 21 and Y-direction 22 bundles) is approximately 0.89 mm as shown in FIG. 3. One Z-direction bundle 23 passes through each site 25 (the square bounded by the centerlines of pairs of adjacent intersecting X and Y bundles 21 and 22 lying in a transverse plane); this is shown in FIG. 3, which is a plan view taken along lines 3—3 of FIG. 2. Thus the centerline-to-centerline spacing of parallel bundles 23 that run in the Z direction is also approximately 0.89 mm. The distance measured in the Z-direction between parallel bundles running in the X-Y plane is approximately 1.20 mm as shown in FIG. 2 (twice the layer-to-layer distance of approximately 0.60 mm; it is specified as between 1.143 and 1.270 mm in NAVSEA WS 23199).

Figure 4:
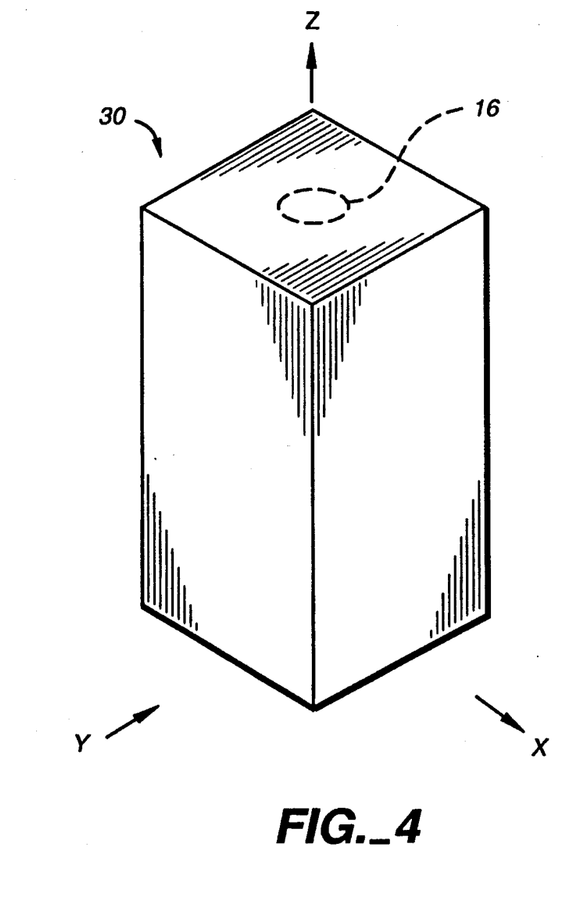
FIG. 4 is a representation of the nose-tip preform, a three-dimensional woven-fabric block.
Figure 5:
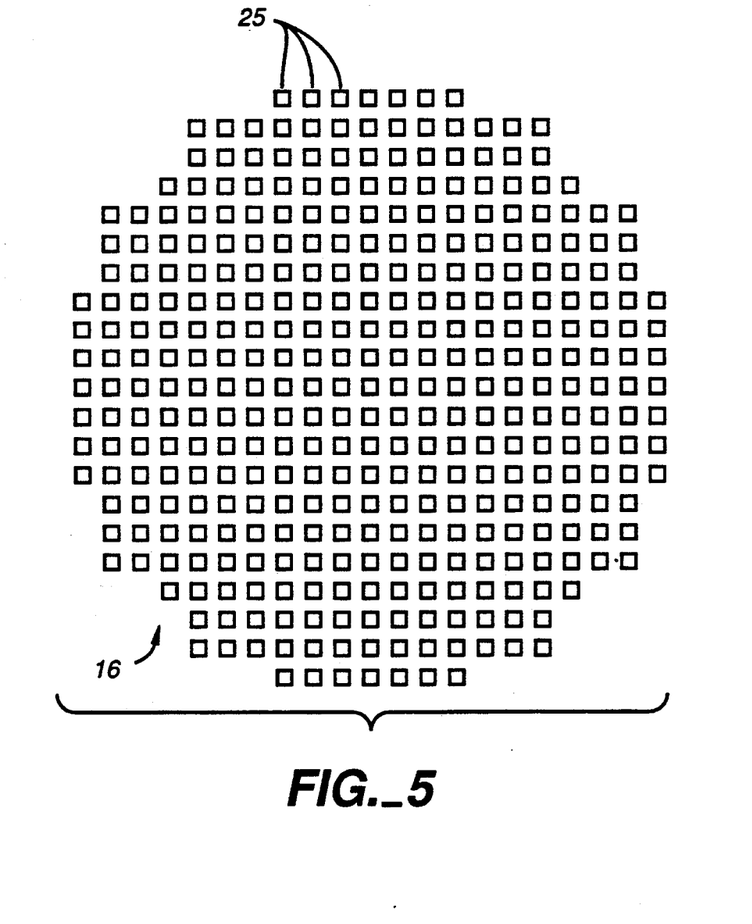
FIG. 5 is a representation of a cross-sectional view through a cylindrical central core zone containing a number of innermost sites, through each of which pass a metallized strand bundle.

FIG. 4 shows the nose-tip preform 30, a three dimensional fabric block of woven-together bundles that has some inherent structural integrity due to the friction between adjacent tightly-woven bundles. The nominal dimensions of the preform are 150 mm square by 250 mm high. Each bundle of which the preform 30 is woven is a pitch yarn, with the exception of those Z-direction bundles lying within the cylindrical central core zone 16 where each Z-direction bundle is a metallized strand. This is the sole difference between the region within the cylindrical central core zone 16 and the region outside of core zone 16. FIG. 5 represents a cross-sectional view through a cylindrical central core zone 16, showing (for example) one representative pattern of sites 25.

Figure 6:
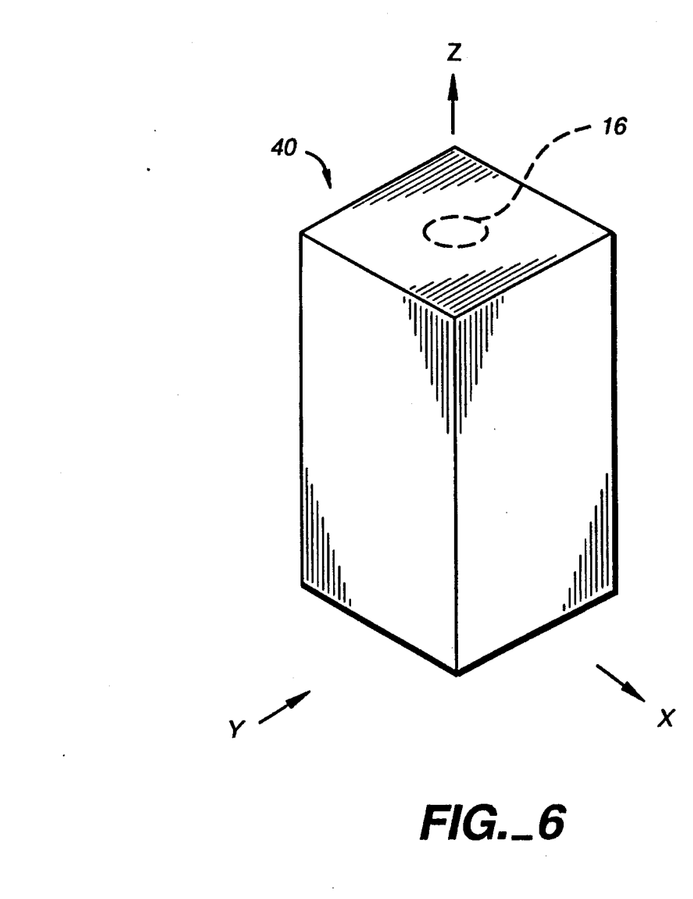
FIG. 6 is a representation of the nose-tip billet, which has been rough-machined from a pitch-impregnated preform intermediate product.

FIG. 6 shows the billet 40 (an intermediate product produced from the woven preform 30 that has been pitch-impregnated and processed); it is a rigid block of fiber-reinforced carbon matrix material machined to the approximate dimensions of 133 mm square by 229 mm high and symmetrically oriented (i.e., centered) about the centerline axis of the cylindrical central core zone 16.

Figure 7:
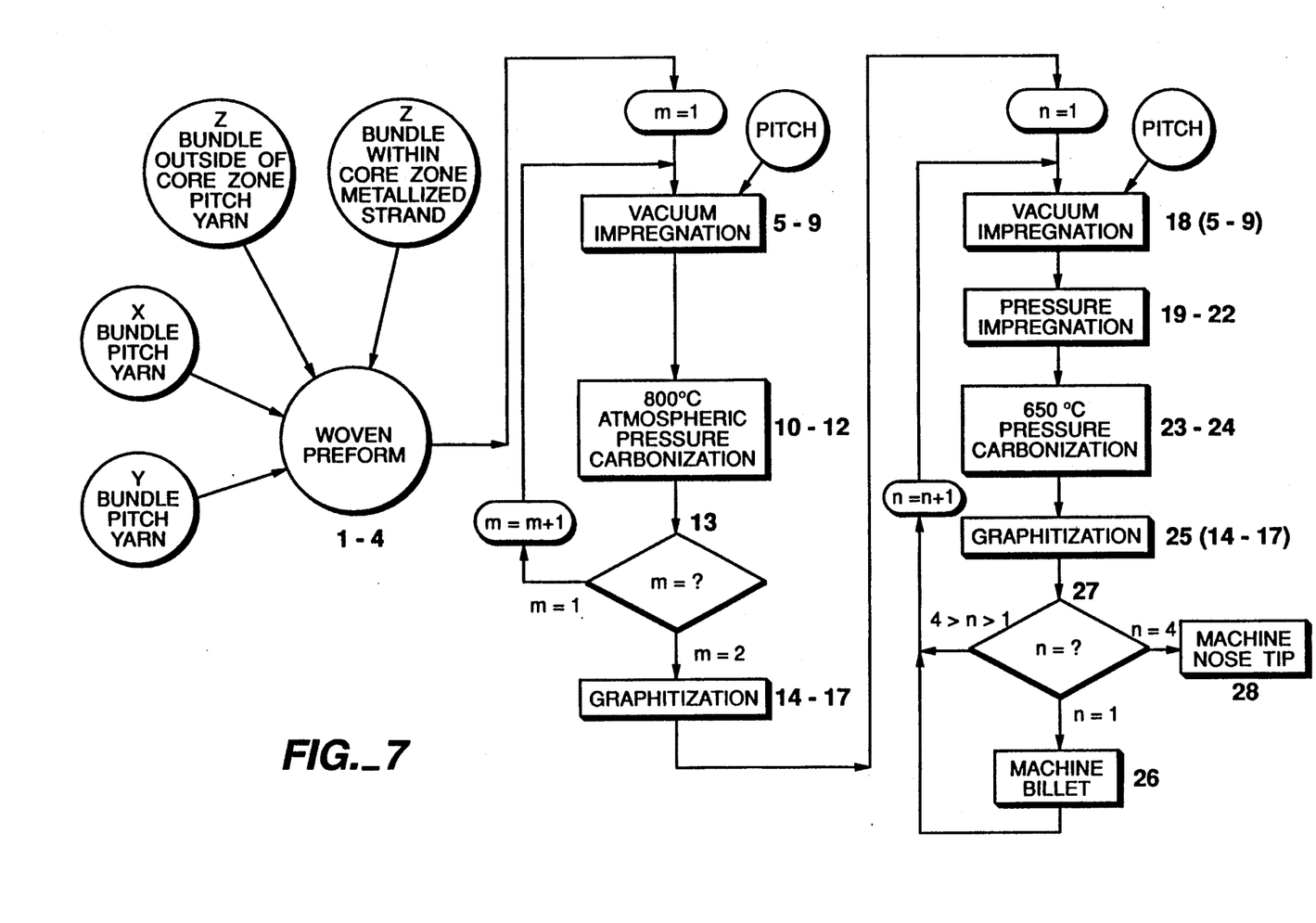
FIG. 7 is a diagrammatic representation of the manufacturing process whereby the final product (the shape-stable nose tip) is obtained; the numbers alongside the various blocks correspond to the step numbers in the product-by-process claim.

FIG. 7 is a diagrammatic representation of the manufacturing process utilized to produce the shape stable nose tip 10 (the numbers alongside the various blocks correspond to the step numbers in the product-by-process claim). The following description of the manufacturing process makes repeated references to this process chart.

PREFORM WEAVING PROCESS (PWP)

(FIG. 7, Steps 1-4)

A nose-tip preform 30 (a three-dimensional fabric block, as previously described) is woven from reinforcement bundles running in the X, Y, and Z directions. If, for examples, exactly 170 X-direction bundles 21 and 170 Y-direction bundles 22 were used at every corresponding transverse (X-Y plane) layer of stacked bundles, there would be created exactly 28,561 (169×169=28,561) open sites 25 each bounded by two X and two Y bundles. NAVSEA WS 23119 specifies centerline-to-centerline distance requirements between adjacent parallel reinforcing bundles lying in the transverse plane as from 0.84 to 0.94 mm (nominally 0.89 mm), which also determines the Z-direction reinforcing bundles 23 centerline-to-centerline distance from 0.84 to 0.94 mm (measured in the X or Y direction). The method chosen for weaving the preform 30 is not important, so long as the overall dimensions of the completed preform (140 to 159 mm width of the square transverse cross-section, and 235 to 267 mm height), the spacing between reinforcing bundle centerlines, and the minimum bulk density (0.80 grams/cc) requirements are satisfied. Pitch yarns are used as the reinforcing bundles, with the sole exception being the metallized strand Z-direction bundles which run (one strand per site) through the innermost sites thereby defining the cylindrical central core zone 16.

After the nose tip preform 30 has been woven, it is first subjected to an initial vacuum pitch impregnation process (VPIP) as set forth below. The vacuum pitch impregnation process is a process that will be repeated several times and at different places within the total manufacturing process (for a total of six times, VPIP1 through VPIP6). Another process that is repeated several times at different places is the high temperature graphitization process (HTGP; performed a total of five times, HTGP1 through HTGP5).

VACUUM PITCH IMPREGNATION PROCESS (VPIP)

FIG. 7, Steps 5-9

The vacuum pitch impregnation process (hereinafter VPIP) consists of placing the preform 30 (or intermediate product as it is designated once processing has begun) within a container suitable for holding liquid pitch and then loading the container into a suitable commercial impregnator apparatus. The intermediate product should then be placed under a vacuum (air atmosphere at an absolute pressure below 200 mm of mercury) and held at a temperature between 275 and 325° C. for at least 90 minutes and at most 24 hours to precondition it for being impregnated with liquid pitch.

Liquid pitch (at a temperature between 245° and 295° C.) is then transferred into the container in an amount sufficient to immerse the entire intermediate product to a depth of at least 5 cm below the top of the liquid pitch surface. The temperature and absolute pressure is then maintained between 250° and 300° C. and below 200 mm of mercury for from 30 minutes to 12 hours; after which the pressure is raised to atmospheric (by admitting nitrogen gas) and the heating shut off, the temperature being allowed to drop to below 195° C. before removing the intermediate product and container from the impregnator.

After the first time the VPIP is performed (VPIP1) the intermediate product (as the treated nose tip preform is now designated) is subjected to the atmospheric pressure carbonization process (APCP) described below; following that first atmospheric pressure carbonization (APCP1) process the entire preceding process (vacuum pitch impregnation followed by atmospheric pressure carbonization) is done once again (VPIP2 followed by APCP2). Then the preform is subjected to the first high temperature graphitization process (HTGP1), the description of which follows after the immediately following description of the atmospheric pressure carbonization process.

ATMOSPHERIC PRESSURE CARBONIZATION PROCESS (APCP)

FIG. 7, Steps 10-12

The atmospheric pressure carbonization process (hereinafter APCP) consists of placing the intermediate product into a suitable commercial carbonizer apparatus set up to operate with a nitrogen gas atmosphere at normal atmospheric pressure. The intermediate product is then heated (at a maximum average rate of 60° C. per hour and maximum hourly rate of 170° C. per hour) to increase the temperature from ambient to between 325° and 375° C., next heated (at a maximum average rate of 20° C. per hour and maximum hourly rate of 65° C. per hour) to between 575° and 625° C., and finally heated (at a maximum average rate of 30° C. per hour and maximum hourly rate of 60° C. per hour) to between 775° and 825° C. The intermediate product is the held at between 775° and 825° C. for from 1 to 8 hours; after which it is removed from the carbonizer after the temperature has been allowed to drop below 195° C.

The APCP is performed only two times (as APCP1 and APCP2, each time immediately following the VPIP processes VPIP1 and VPIP2). After the second time it has been performed (APCP2) the preform is then subjected to the first high temperature graphitization process (HTGP1).

HIGH TEMPERATURE GRAPHITIZATION PROCESS (HTGP)

FIG. 7, Steps 14-17

The high temperature graphitization process (hereinafter HTGP) consists of placing the intermediate product into a commercial graphitization oven, where inert gas at atmospheric pressure is to flow through at a minimum flow rate of 0.42 cubic meters per hour when the temperature is above 195° C. Temperature is increased by heating at a maximum average rate of 150° C. per hour and maximum hourly rate of 200° C. per hour to increase the temperature from ambient to between 825° and 1025° C., then heating at a maximum average rate of 60° C. per hour and maximum hourly rate of 105° C. per hour to between 1300° and 1400° C., then heating at a maximum average rate of 40° C. per hour and maximum hourly rate of 55° C. per hour to between 1550° and 1650° C., then heating at a maximum rate hourly rate of 145° C. per hour to between 2300° and 2450° C. The temperature is then maintained at between 2300° and 2450° C. for a minimum of 2 hours and 45 minutes; heating is thereafter shut off and the intermediate product removed from the graphitization oven after the temperature has dropped to below 195° C.

After the first HTGP (HTGP1) the intermediate product is subjected to the first high pressure pitch impregnation and carbonization process (HPPI&CP1). The HPPI&CP is carried out four times; each time it is followed by another high temperature graphitization process (e.g., HPPI&C4 is followed by HTGP5).

HIGH PRESSURE PITCH IMPREGNATION AND CARBONIZATION PROCESS (HPPI&CP)

FIG. 7, Steps 18-24

The vacuum impregnation process previously described (VPIP) is performed again as the initial portion of this procedure (i.e., it is incorporated into this procedure, for example HPPI&CP1 includes VPIP3); then the intermediate product (now immersed in a pitch container) is loaded into a vessel suitable for the high pressure impregnation process. The vessel is then pressurized with argon gas to between 95 and 109 bars at a maximum rate of 1020 bars per hour, while heating as necessary (at a maximum average rate of 50° C. per hour and at a maximum hourly rate of 75° C. per hour) to maintain the temperature between 260° and 340° C. for from 30 minutes to 24 hours. The gas pressure is next increased to between 946 and 1027 bars at a maximum rate of 1020 bars per hour and maintain at temperature between 260° and 340° C. for from 30 minutes to 24 hours. Heating then is continued (at a maximum average rate of 50° C. per hour and at a maximum hourly rate of 75° C. per hour) to a temperature between 310° and 390° C.; that temperature is maintained for from 1 to 24 hours. The temperature is finally increased to between 590° and 710° C. (by heating at a maximum average rate of 50° C. per hour and at a maximum hourly rate of 100° C. per hour) held there for a minimum of one hour. Finally heating is shut off and the vessel is allowed to naturally cool to below 195° C. before venting the vessel and removing the intermediate product from the vessel (and from the pitch container).

After each one of the four pressure pitch impregnation and carbonization processes (HPPI&CP1 through HPPI&CP4) a high temperature graphitization process (HTGP2 through HTGP5) immediately follows; e.g., HPPI&CP3 is followed by HTGP4. The combination of these two processes (i.e., a HPPI&CP followed by a HTGP) is repeated four times with no intervening process except that the intermediate product (now being a quite rigid block) is machined to the billet dimensions after the first time through (i.e., after the performance of HPPI&CP1 and HTGP2). In machining to billet size (as shown in FIG. 6) the intermediate product is centered about the Z-direction center axis of the cylindrical central core zone 16.

FINAL PROCESSES

FIG. 7, Steps 25-28

The final manufacturing step (i.e., after the performance of HPPI&CP4 and HTGP5) consists of machining the completed billet 40 to the nose tip 10 configuration shown in FIG. 1, having a generally conical shape with a spherical tip.

This invention has been described in detail with particular reference to a certain nose tip preferred embodiment. The detailed manufacturing process for producing this particular nose tip product is the result of a development effort, involving considerable experimentation, to produce a nose-tip that satisfied aerodynamic, structural, thermal, and detection-avoidance requirements. The process for producing this nose tip has been set forth in considerable detail; the referenced NAVSEA specifications (e.g., NAVSEA WS 23201) set forth (among other things) detailed requirements that the product must meet (e.g., a minimum bulk density of 2.01 gm/cc; an open porosity of 6.3 to 8.5 percent) and corrective procedures that may be taken if some requirements are not met. It is likely that considerable further experimentation effort would be required to develop a manufacturing process suitable for a nose tip that differed substantially from the particular preferred embodiment described herein.

That which is claimed is:

1. A shape-stable reentry body nose tip produced by a process comprising the steps of:
   (1) forming in space a plurality of square planes of pitch yarn by arranging side-by-side and substantially parallel and coplanar to each other and spaced approximately 0.89 mm center-to-center distance apart approximately 170 individual substantially straight pitch yarns each approximately 150 mm long, thereby defining a square layer of pitch yarn approximately 150 mm long on each edge;
   (2) stacking said square layers directly on top of and parallel to one another at a spacing of approximately 1667 layers per meter with the direction of the pitch yarns of adjacent layers oriented orthogonally thereby defining X and Y directions and a Z direction perpendicular thereto and further defining approximately 28,561 open sites running in the Z direction bounded by said pitch yarns, continuing such stacking until a height in the Z direction of approximately 250 mm is reached;
   (3) placing metallized strands each approximately 250 mm long and running in the Z direction, one said strand through each innermost open site within a central core zone;
   (4) placing pitch yarns each approximately 250 mm long and running in the Z direction, one said pitch yarn through each of the remaining open sites, whereby a three-dimensional woven nose-tip preform intermediate product has been produced;
   (5) placing the intermediate product within a container suitable for holding liquid pitch and then loading the container into an impregnator;
   (6) preconditioning the intermediate product in an air atmosphere at an absolute pressure below 200 mm of mercury and at a temperature between 275° and 325° C. for at least 90 minutes and at most 24 hours;
   (7) transferring liquid pitch at a temperature between 245° and 295° C. into the container in an amount sufficient to immerse the entire intermediate product to a depth of at least 5 cm below the top of the liquid pitch surface;
   (8) heating as necessary to maintain the temperature at between 250° and 300° C. while maintaining the absolute pressure below 200 mm of mercury for from 30 minutes to 12 hours;
   (9) admitting nitrogen gas to increase the pressure to atmospheric, then shutting off heating and removing the container with intermediate product from the impregnator after the temperature has dropped to below 195° C.;
   (10) placing the intermediate product into a carbonizer utilizing a nitrogen gas atmosphere at atmospheric pressure;
   (11) heating at a maximum average rate of 60° C. per hour and maximum hourly rate of 170° C. per hour to increase the temperature from ambient to between 325° and 375° C., then heating at a maximum average rate of 20° C. per hour and maximum hourly rate of 65° C. per hour to between 575° and 625° C., then heating at a maximum average rate of 30° C. per hour and maximum hourly rate of 60° C. per hour to between 775° and 825° C.;
   (12) heating as necessary to maintain the temperature at between 775° and 825° C. for from 1 to 8 hours, then shutting off heating and removing the intermediate product when the temperature has dropped to below 195° C.;
   (13) repeating the preceding steps 5 through 12 one time, then going on to step 14;
   (14) placing the intermediate product in an oven suitable for use in a graphitization process;
   (15) flowing inert gas at atmospheric pressure through the oven at a minimum flow rate of 0.42 cubic meters per hour when the temperature is above 195° C.;
   (16) heating at a maximum average rate of 150° C. per hour and maximum hourly rate of 200° C. per hour to increase the temperature from ambient to between 825° and 1025° C., then heating at a maximum average rate of 60° C. per hour and maximum hourly rate of 105° C. per hour to between 1300° and 1400° C., then heating at a maximum average rate of 40° C. per hour and maximum hourly rate of 55° C. per hour to between 1550° and 1650° C., then heating at a maximum rate hourly rate of 145° C. per hour to between 2300° and 2450° C.;
   (17) heating as necessary to maintain the temperature at between 2300° and 2450° C. for a minimum of 2 hours and 45 minutes, then shutting off heating and removing the intermediate product after the temperature has dropped to below 195° C.;
   (18) performing steps 5 through 9 again, then going on to step 19;
   (19) loading the immersed intermediate product and pitch container into a vessel suitable for high pressure impregnation;
   (20) pressurizing with argon gas to between 95 and 109 bars at a maximum rate of 1020 bars per hour, while heating as necessary at a maximum average rate of 50° C. per hour and at a maximum hourly rate of 75° C. per hour to maintain the temperature 260° and 340° C. for from 30 minutes to 24 hours;
   (21) increasing gas pressure to between 946 and 1027 bars at a maximum rate of 1020 bars per hour and maintain at temperature between 260° and 340° C. for from 30 minutes to 24 hours;
   (22) heating at a maximum average rate of 50° C. per hour and at a maximum hourly rate of 75° C. per hour to between 310° and 390° C., then maintaining temperature between 310° and 390° C. for from 1 to 24 hours;
   (23) heating at a maximum average rate of 50° C. per hour and at a maximum hourly rate of 100° C. per hour to between 590° and 710° C., then maintaining temperature between 590° and 710° C. for a minimum of one hour;
   (24) shutting off heating and allowing to naturally cool to below 195° C. before venting and removing the intermediate product from vessel and pitch container;
   (25) graphitizing by performing steps 14 through 17;
   (26) machining to billet size;
   (27) repeating steps 18 through 25 three times, then going to step 28; and
   (28) machining to final nose tip configuration having a generally conical shape with a spherical tip.

* * * * *